United States Patent
Chen

(10) Patent No.: US 9,723,255 B2
(45) Date of Patent: Aug. 1, 2017

(54) SIGNAL SWITCHING SYSTEM AND SET TOP BOX USING SAME

(71) Applicants: AMBIT MICROSYSTEMS (SHANGHAI) LTD., Shanghai (CN); HON HAI PRECISION INDUSTRY CO., LTD., New Taipei (TW)

(72) Inventor: Tao Chen, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/826,793

(22) Filed: Aug. 14, 2015

(65) Prior Publication Data

US 2017/0034472 A1    Feb. 2, 2017

(30) Foreign Application Priority Data

Jul. 29, 2015   (CN) .......................... 2015 1 0453477

(51) Int. Cl.
*H04N 5/775*   (2006.01)
*H04N 5/44*   (2011.01)
(Continued)

(52) U.S. Cl.
CPC ............... *H04N 5/775* (2013.01); *H04N 5/44* (2013.01); *H04N 21/43622* (2013.01); *H04N 21/43632* (2013.01); *H04N 21/4135* (2013.01)

(58) Field of Classification Search
CPC .... H04N 21/61; H04N 5/775; H04N 21/4135; H04N 21/43615; H04N 5/4403;
(Continued)

(56) References Cited

U.S. PATENT DOCUMENTS 5,631,850 A * 5/1997 Tanaka ................... H04N 5/765
                                                    348/705
7,812,890 B2 * 10/2010 Chiu ......................... G06T 1/60
                                                    348/554
(Continued)

FOREIGN PATENT DOCUMENTS

TW        200640256       11/2006

*Primary Examiner* — Nathan Flynn
*Assistant Examiner* — Cynthia Fogg
(74) *Attorney, Agent, or Firm* — Steven Reiss

(57) ABSTRACT

A signal switching system includes a first connector, a second connector, a switch unit, a first comparator, and a second comparator. The first connector is electronically coupled to a television. The second connector is electronically coupled to a video playback device. The first comparator is electronically coupled between the first connector and the switch; and the second comparator is electronically coupled between the second connector and the switch. The first comparator outputs a control command to the switch unit according to the voltage of the first connector, and the second comparator outputs a control command to the switch unit according to the voltage of the second connector. The switch unit selectively outputs a first signal or a second signal to the first connector or the second connector according to the control commands output from the first comparator and the second comparator.

12 Claims, 3 Drawing Sheets

(51) Int. Cl.
*H04N 21/436* (2011.01)
*H04N 21/4363* (2011.01)
*H04N 21/41* (2011.01)

(58) Field of Classification Search
CPC ....... H04N 21/43632; H04N 21/43635; H04N 21/43637; H04N 21/4383; H04N 5/268; H04N 21/41; H04N 21/42607; H04N 21/436; H04N 21/4382; H04N 5/44; H04N 5/46; H04N 5/765; H04N 21/4325; H04N 21/43622
USPC ............ 725/151, 131, 139; 348/E5.002, 706
See application file for complete search history.

(56) References Cited

U.S. PATENT DOCUMENTS

| | | | | |
|---|---|---|---|---|
| 2005/0164629 | A1* | 7/2005 | Hirai | H04H 40/90 455/3.02 |
| 2005/0165967 | A1* | 7/2005 | Woolgar | H04L 12/2805 710/1 |
| 2006/0221254 | A1* | 10/2006 | Chang | H04N 5/268 348/706 |
| 2008/0148337 | A1* | 6/2008 | Laville | H04N 21/4382 725/151 |
| 2012/0036548 | A1* | 2/2012 | Guitton | H04N 5/44 725/151 |

* cited by examiner

SIGNAL SWITCHING SYSTEM AND SET TOP BOX USING SAME

FIELD

The subject matter herein generally relates to television broadcasting systems, and particularly to a signal switching system and a set top box (STB).

BACKGROUND

Set top boxes are devices known in the art that can be connected to a television (TV) or a video playback device (a DVD players/recorder, for example). In particular, the set top box includes a TV SCART port and a VCR SCART port. The TV SCART port connects to the television to output a first signal (a living signal, for example) to the television, and the VCR SCART port connects to the video playback device to receive a second signal (a playback signal, for example) from the video playback device.

BRIEF DESCRIPTION OF THE DRAWINGS

Implementations of the present technology will now be described, by way of example only, with reference to the attached figures.

DETAILED DESCRIPTION

Figure 1:
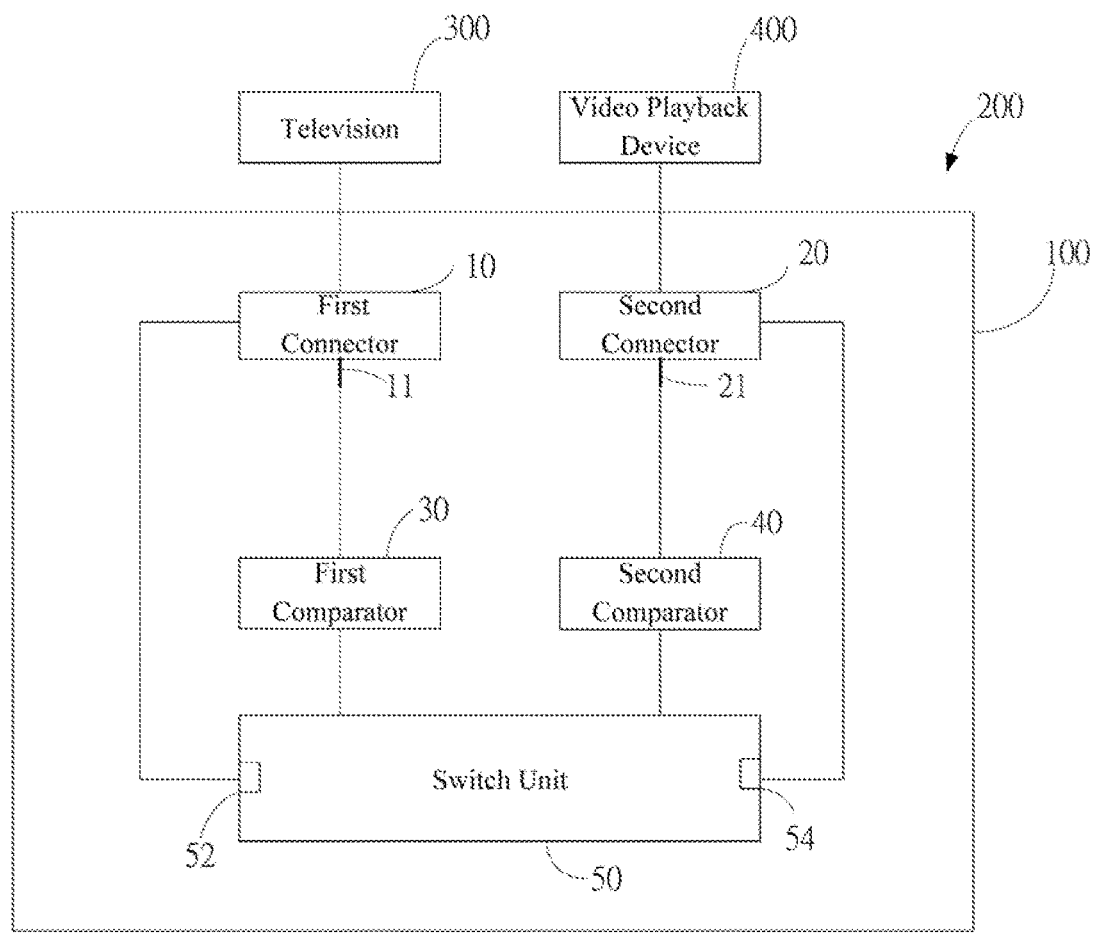
FIG. 1 is a block diagram of a signal switching system, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a signal switching system and a set top box.

FIG. 1 illustrates an embodiment of a signal switching system 100, according to an exemplary embodiment. The signal switching system 100 is employed in a set top box (STB) 200, and the set top box 200 is electronically coupled between a television 300 and a video playback device 400. In at least one embodiment, the video playback device 400 can be a DVD players/recorder. In a video playback mode, the television 300 receives video programs played by the video playback device 400 via the set top box 200. In a live television mode, the television 300 receives television programs output from the set top box 200.

The signal switching system 100 includes a first connector 10, a second connector 20, a first comparator 30, a second comparator 40, and a switch unit 50.

In at least one embodiment, the first connector 10 can be a TV SCART port, and is configured to be electronically coupled to the television 300 via a first cable. The second connector 20 can be a VCR SCART port, and is configured to be electronically coupled to the video playback device 400 via a second cable. In detail, the first connector 10 includes a control pin 11 (a PIN8 of the first connector 10, for example). Generally, when an aspect ratio of an image signal input to the first connector 10 is about 16:9, a voltage of the control pin 11 may be greater than 5V, and when no signal is input to the first connector 10, the voltage of the control pin 11 may be less than 0.7V. The second connector 20 includes a control terminal 21 (a PIN8 of the second connector 20, for example). Generally, when an aspect ratio of an image signal input to the second connector 20 is about 16:9, a voltage of the control terminal 21 may be greater than 5V, and when no signal is input to the second connector 20, the voltage of the control terminal 21 may be less than 0.7V.

The first comparator 30 is electronically coupled between the first connector 10 and the switch unit 50, and is configured to output a control command to the switch unit 50 according to the voltage of the first connector 10. In detail, the first comparator 30 has a first predetermined voltage and a second predetermined voltage. In at least one embodiment, the first predetermined voltage is 5V, and the second predetermined voltage is 0.7V. If the voltage of the first control pin 11 is less than the second predetermined voltage, the first comparator 30 outputs a low level to the switch unit 50. If the voltage of the first control pin 11 is greater than the first predetermined voltage, the first comparator 30 outputs a high level to the switch unit 50.

The second comparator 40 is electronically coupled between the second connector 20 and the switch unit 50, and is configured to output a control command to the switch unit 50 according to the voltage of the second connector 20. In detail, the second comparator 40 also has the said first predetermined voltage and the said second predetermined voltage. If the voltage of the second control terminal 21 is less than the second predetermined voltage, the second comparator 40 outputs a low level to the switch unit 50. If the voltage of the second control terminal 21 is greater than the first predetermined voltage, the second comparator 40 outputs a high level to the switch unit 50.

The switch unit 50 is configured to receive a first signal (a playback signal, for example) from the video playback device 400 and receive a second signal (a living signal, for example) from the set top box 200. In addition, the switch unit 50 includes a first output port 52 and a second output port 54. The first output port 52 is electronically coupled to the first connector 10, and the second output port 54 is electronically coupled to the second connector 20. The switch unit 50 is further configured to selectively output the first signal and the second signal to the first connector 10 or the second connector 20 via the first output port 52 or the second output port 54. In detail, when the switch unit 50 receives the high level output from the first comparator 30 and the low level output from the second comparator 40, the switch unit 50 outputs the second signal via the first output port 52 or outputs the first signal via the second output port 54. When the switch unit 50 receives the low level output from the first comparator 30 and the high level output from the second comparator 40, the switch unit 50 outputs the first signal via the first output port 52 or outputs the second signal via the second output port 54.

Figure 2:
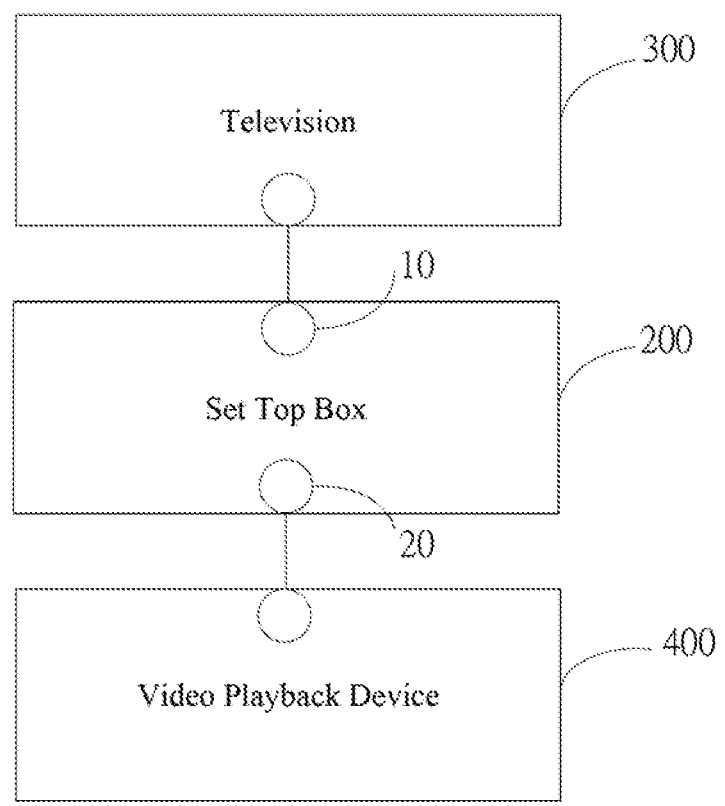
FIG. 2 is a first connection manner among the signal switching system of FIG. 1 and a television and a video playback device.

FIG. 2 illustrates that the television 300 is coupled to the first connector 10 via the first cable and the video playback device 400 is coupled to the second connector 20 via the second cable. At this time, the connection manner among the set top box 200, the television 300, and the video playback device 400 may be regarded as normal.

In the video playback mode, the set top box 200 receives the first signal from the video playback device 400. In an initial phase, the voltage of the second connector 20 is greater than the first predetermined voltage to allow the second comparator 40 to output the high level to the switch unit 50, and the voltage of the first connector 10 is less than the second predetermined voltage to allow the first comparator 30 to output the low level to the switch unit 50. Thus, the switch unit 50 controls the first output port 52 to output the first signal to the first connector 10. At this time, the television 300 receives the first signal, and thus plays the video programs.

In the live television mode, the set top box 200 outputs the second signal. In an initial phase, the voltage of the second connector 20 is less than the second predetermined voltage to allow the second comparator 40 to output the low level to the switch unit 50, and the voltage of the first connector 10 is greater than the first predetermined voltage to allow the first comparator 30 to output the high level to the switch unit 50. Thus, the switch unit 50 controls the first output port 52 to output the second signal to the first connector 10. At this time, the television 300 receives the second signal, and thus plays the television programs.

Figure 3:
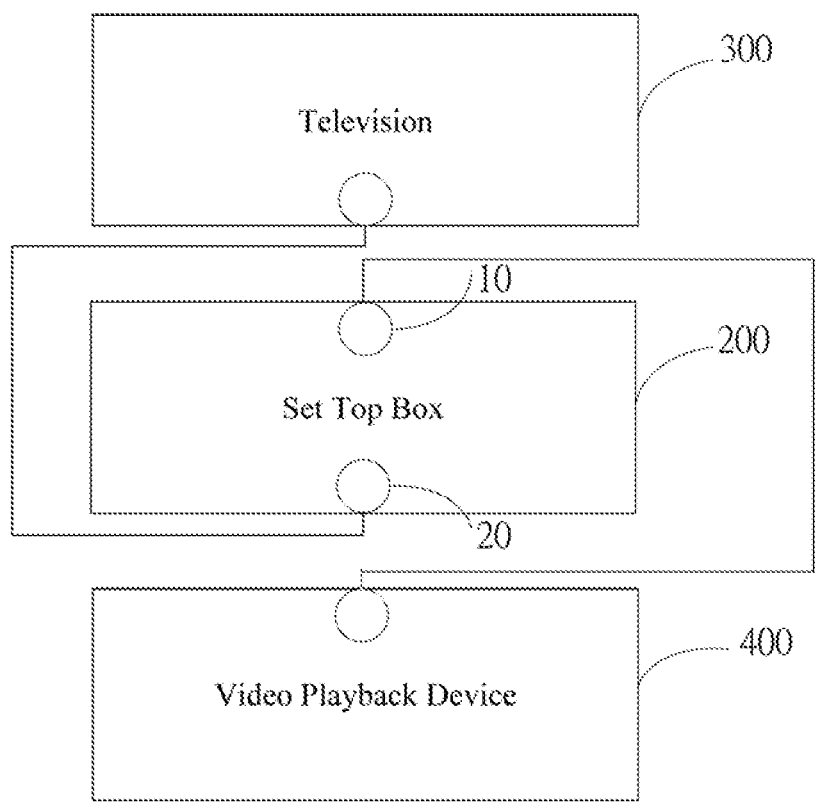
FIG. 3 is a second connection manner among the signal switching system of FIG. 1 and the television and the video playback device.

FIG. 3 illustrates that the television 300 is coupled to the second connector 20 via the first cable and the video playback device 400 is coupled to the first connector 10 via the second cable. At this time, the connection manner among the set top box 200, the television 300, and the video playback device 400 may be regarded as abnormal.

In the video playback mode, the set top box 200 receives the first signal from the video playback device 400. In an initial phase, the voltage of the first connector 10 is greater than the first predetermined voltage to allow the first comparator 30 to output the high level to the switch unit 50, and the voltage of the second connector 20 is less than the second predetermined voltage to allow the second comparator 40 to output the low level to the switch unit 50. Thus, the switch unit 50 controls the second output port 54 to output the first signal to the second connector 20. At this time, the television 300 receives the first signal, and thus plays the video programs.

In the live television mode, the set top box 200 outputs the second signal. In an initial phase, the voltage of the second connector 20 is greater than the first predetermined voltage to allow the second comparator 40 to output the high level to the switch unit 50, and the voltage of the first connector 10 is less than the second predetermined voltage to allow the first comparator 30 to output the low level to the switch unit 50. Thus, the switch unit 50 controls the second output port 54 to output the second signal to the second connector 20. At this time, the television 300 receives the second signal, and thus plays the television programs.

The first comparator 30 determines the voltage of the first connector 10, the second comparator 40 determines the voltage of the second connector 20, and the switch unit 50 controls the first output port 52 and the second output port 54 to output the first signal or the second signal according to determination results of the first comparator 30 and the second comparator 40. Thus, the television can play the television programs or the video programs even though the set top box 200, the television 300, and the video playback device 400 are misconnected. Therefore, the signal switching system 100 is both intelligent and convenient.

The embodiments shown and described above are only examples. Many details are often found in the art such as the other features of the signal switching system and the set top box using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A signal switching system comprising:
a first connector configured to be electronically coupled to a television;
a second connector configured to be electronically coupled to a video playback device;
a switch unit electronically coupled to the first connector and the second connector;
a first comparator electronically coupled between the first connector and the switch unit;
a second comparator electronically coupled between the second connector and the switch unit;
wherein the first comparator outputs a first control command to the switch unit according to voltage of the first connector, and the second comparator outputs a second control command to the switch unit according to the voltage of the second connector; and
wherein the switch unit selectively outputs a first signal from the video playback device to the first connector or the second connector, according to the first control command output from the first comparator and the second command output from the second comparator, or selectively outputs a second signal from the television to the first connector or the second connector according to the first control command output from the first comparator and the second command output from the second comparator;
when the first connector is coupled to the video playback device abnormally and the second connector is coupled to the television abnormally, the switch unit outputs the second signal from the television to the second connector according to the first control command output from the first comparator and the second command output from the second comparator, or outputs the first signal from the video playback device to the first connector according to the first control command output from the first comparator and the second command output from the second comparator; and when the first connector is coupled to the television normally and the second connector is coupled to the video playback device normally, the switch unit outputs the second signal from the video playback device to the second connector according to the first control command output from the first comparator and the second command output from the second comparator, or outputs the first signal from the television to the first connector according to the first control command output from the first comparator and the second command output from the second comparator.

2. The signal switching system as claimed in claim 1, wherein the first comparator is set with a first predetermined voltage and a second predetermined voltage, if the voltage of the first connector is less than the second predetermined voltage, the first comparator outputs a low level to the switch unit, and if the voltage of the first connector is greater than the first predetermined voltage, the first comparator outputs a high level to the switch unit.

3. The signal switching system as claimed in claim 2, wherein the second comparator is set with the said first predetermined voltage and the said second predetermined voltage, if the voltage of the second connector is less than the second predetermined voltage, the second comparator outputs the low level to the switch unit, and if the voltage of the second connector is greater than the first predetermined voltage, the second comparator outputs the high level to the switch unit.

4. The signal switching system as claimed in claim 3, wherein the switch unit comprises a first output port and a second output port, the first output port is electronically coupled to the first connector, and the second output port is electronically coupled to the second connector.

5. The signal switching system as claimed in claim 4, wherein when the switch unit receives the high level from the first comparator and the low level from the second comparator, the switch unit outputs the second signal via the first output port or outputs the first signal via the second output port.

6. The signal switching system as claimed in claim 4, wherein when the switch unit receives the low level from the first comparator and the high level from the second comparator, the switch unit outputs the first signal via the first output port or outputs the second signal via the second output port.

7. A set top box comprising:
a first connector configured to be electronically coupled to a television;
a second connector configured to be electronically coupled to a video playback device;
a switch unit electronically coupled to the first connector and the second connector;
a first comparator electronically coupled between the first connector and a switch unit;
a second comparator electronically coupled between the second connector and the switch unit;
wherein the first comparator outputs a first control command to the switch unit according to the voltage of the first connector, and the second comparator outputs a second control command to the switch unit according to the voltage of the second connector; and
wherein the switch unit selectively outputs a first signal from the video playback device or a second signal from the television to the first connector or the second connector according to the first control command output from the first comparator and the second control command output from the second comparator;

when the first connector is coupled to the video playback device abnormally and the second connector is coupled to the television abnormally, the switch unit outputs the second signal from the television to the second connector according to the first control command output from the first comparator and the second command output from the second comparator, or outputs the first signal from the video playback device to the first connector according to the first control command output from the first comparator and the second command output from the second comparator; and when the first connector is coupled to the television normally and the second connector is coupled to the video playback device normally, the switch unit outputs the second signal from the video playback device to the second connector according to the first control command output from the first comparator and the second command output from the second comparator, or outputs the first signal from the television to the first connector according to the first control command output from the first comparator and the second command output from the second comparator.

8. The set top box as claimed in claim 7, wherein the first comparator is set with a first predetermined voltage and a second predetermined voltage, if the voltage of the first connector is less than the second predetermined voltage, the first comparator outputs a low level to the switch unit, and if the voltage of the first connector is greater than the first predetermined voltage, the first comparator outputs a high level to the switch unit.

9. The set top box as claimed in claim 8, wherein the second comparator is set with the said first predetermined voltage and the said second predetermined voltage, if the voltage of the second connector is less than the second predetermined voltage, the second comparator outputs the low level to the switch unit, and if the voltage of the second connector is greater than the first predetermined voltage, the second comparator outputs the high level to the switch unit.

10. The set top box as claimed in claim 9, wherein the switch unit comprises a first output port and a second output port, the first output port is electronically coupled to the first connector, and the second output port is electronically coupled to the second connector.

11. The set top box as claimed in claim 10, wherein when the switch unit receives the high level from the first comparator and the low level from the second comparator, the switch unit outputs the second signal via the first output port or outputs the first signal via the second output port.

12. The set top box as claimed in claim 10, wherein when the switch unit receives the low level from the first comparator and the high level from the second comparator, the switch unit outputs the first signal via the first output port or outputs the second signal via the second output port.

\* \* \* \* \*